UNITED STATES PATENT OFFICE 2,665,861

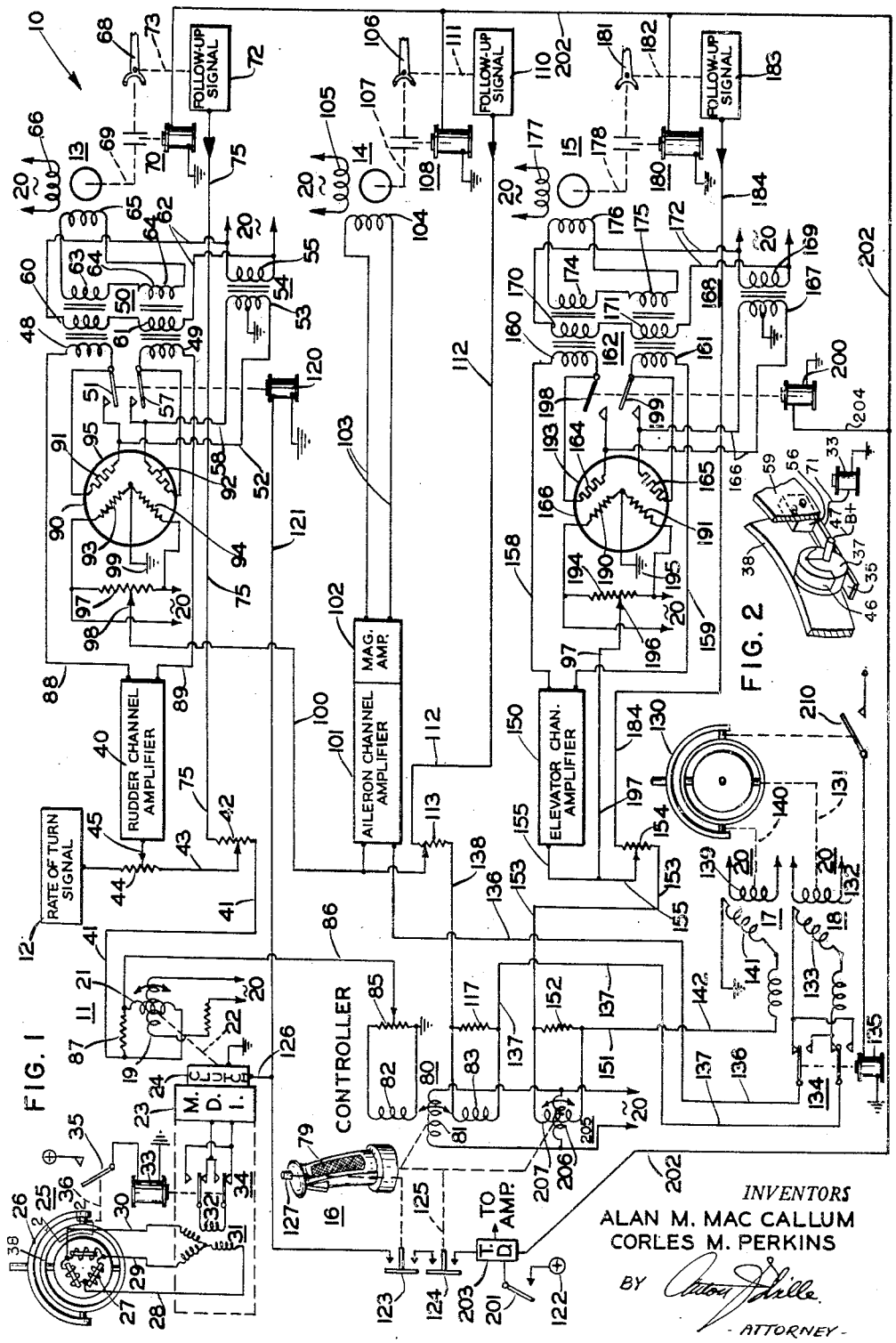

AUTOMATIC PILOT FOR MOBILE CRAFT

Alan M. MacCallum, Plainfield, and Corles M. Perkins, Sr., Rutherford, N. J., assignors to Bendix Aviation Corporation, Teterboro, N. J., a corporation of Delaware Application June 30, 1948, Serial No. 36,224

18 Claims. (Cl. 244—77)

This invention relates to automatic pilot systems for mobile craft, and more particularly to an automatic pilot for aircraft in which the flight of the craft may be controlled through the system by the manipulation of a stick controller.

An object of our present invention is to provide an automatic pilot system for mobile craft in which means are incorporated for flying the craft through acrobatic maneuvers by the manipulation of a stick controller.

A further object of the present invention is to provide an automatic pilot system of the character indicated in which the flight attitude signals of the system are reversed whenever the craft enters a 90° dive or climb.

Another object of our invention is to provide an automatic pilot system for aircraft in which the direction signals of the system are reversed whenever the craft enters a 90° climb.

Still a further object of the invention is to provide an automatic pilot system of the character indicated in which the ambiguities of signals during inverted flight are eliminated.

A further object of this present invention is to provide an automatic pilot system of the character indicated by which inverted flight may be controlled.

Still another object of the present invention is to provide an automatic pilot system of the general character indicated in which provisions are made for automatic bank trim of the aircraft.

Yet a further object of our invention is to provide an automatic pilot system for aircraft in which provisions are made for integrating the pitch attitude signal to provide an opposing signal tending to retard the levelling off of the aircraft upon engagement of the automatic pilot system.

Still another object of this invention is to provide an automatic pilot system of the general character indicated which may be engaged at any time irrespective of the flight attitude of the craft.

Yet another object of this invention is to provide an automatic pilot system for aircraft of the character indicated in which co-ordinated turns are made through the pilot system by the manipulation of the stick controller.

And a further object of our invention is to provide a novel automatic pilot system for aircraft of the character indicated which shall consist of few and simple parts, relatively inexpensive to manufacture, which shall be positive and automatic in its operation, which shall have a large variety of application, and yet be practical and efficient to a high degree in use.

Other objects of this invention will in part be obvious and in part hereinafter pointed out.

In the drawing wherein like reference characters refer to like parts in the two figures;

Fig. 1 is a schematic wiring diagram of an automatic pilot incorporating the novel manual controller unit hereof, and Fig. 2 is a cut-away perspective view taken substantially along line 2—2 of gyro vertical 25 of Fig. 1.

In the accompanying drawing forming a part of this specification, the numeral 10 designates an automatic pilot system interconnecting a source of direction signal voltage 11 and a rate of turn signal voltage 12 with a rudder servomotor 13, an aileron servomotor 14, and an elevator servomotor 15 together with a stick controller 16, a source of pitch signal voltage 17, and a source of bank signal voltage 18.

The directional signal voltage transmitter 11 comprises a rotary transformer having a rotor winding 19 connected across a suitable source of alternating potential 20, and a stator winding 21. The rotor winding 19 is adapted to be rotated through a suitable linkage 22, here shown by a dashed line, by the operation of the master direction indicator 23. A magnetic clutch 24 is provided in the coupling 22 to disconnect the master direction indicator from the transmitter in the manner hereinafter more fully described. The master direction indicator receives its signals from an earth inductor compass system generally designated by the numeral 25. The compass system comprises a gyro vertical 26 and an inductor element mounted thereon; the secondary or output winding 27 alone being herein illustrated. The winding 27 is connected by the leads 28, 29 and 30 to a coupling transmitter 31 of the master direction indicator 23. For a more detailed description of the master direction indicator 23 and its operation, reference may be had to the application of Paul A. Noxon bearing Serial No. 516,490 and filed on December 31, 1943.

For purposes hereinafter appearing, a relay 33 controlling a reversing switch 34 connected in the leads of the coupling transmitter rotor 32 is provided for reversing the signal of the compass system as applied to the master direction indicator. A switch 35, shown in detail in Fig. 2, normally open, is provided for connecting the relay 33 into an energizing circuit. The switch 35 is adapted to be closed through a suitable connection 36 shown in Fig. 1 by a dashed line connected to the pitch axis of the gyro vertical 26. In the cut-away section of the gyro vertical 25, shown in Fig. 2, a cylindrical disc 37 of insulating material is fastened to the gimbal ring 38 about one of the pivots 39 thereof. An arcuate conducting insert 46 extends over an arc of approximately 180° along the upper half of the circumference of the disc when the gyro vertical is in normal erect position and is connected to a source of D. C. potential through a lead 47 which may extend through a central bore in the pivot as shown. A metallic brush or switch arm 35 is mounted on the frame 59 of the gyro vertical and is electrically insulated therefrom as by mounting block 56 fastened to the frame. The brush 56 is connected to the energizing winding of relay 33 by a lead 71. The switch 35 will be closed when the aircraft carrying the hereindescribed system enters a 90° climb.

The displacement of the signal transmitter rotor 19 with respect to the stator coil 21 by the operation of the master direction indicator through the linkage 22 will provide a direction signal which is applied to a rudder channel amplifier 40, shown here in conventional block form. The signals induced in the stator winding 21 are applied through a lead 41 to one end of a potentiometer 42. A tap-off is provided on the potentiometer 42 which is connected by a lead 43 through a second potentiometer 44, the other end of the potentiometer being connected to the rate of turn signal source 12. The rate of turn signal source 12 comprises a rate of turn gyroscope having an electrical pick-off as is well known in the art. A tap-off on potentiometer 44 is provided for feeding the signals to the input of the rudder channel amplifier 40 by a lead 45. A direction signal voltage modified by a rate of turn signal is thus applied to the amplifier 40 for the operation of the servomotor 13.

The direction and rate signals applied to the amplifier 40 are amplified and discriminated as to phase, to operate the servomotor 13 in one direction or the other depending upon the phase of the input signal voltages. The output of the amplifier 40 is applied via leads 88 and 89 across the saturating windings 48 and 49 of a magnetic reactor or amplifier 50 having a soft iron core (not shown). The winding 48 is connected through a normally closed switch 51 (shown open for reasons hereinafter appearing) and lead 52 to one end of the grounded center tapped secondary winding 53 of a transformer 54; the primary winding 55 of which is connected to the source 20. The saturating winding 49 is also connected through a normally closed switch 57 (also shown open) and lead 58 to the other end of the secondary winding 53. The primary windings 60 and 61 of the reactor 50 are connected in series across the potential source 20 by the leads 62. The secondary windings 63 and 64 of the reactor 50 are connected in series opposed relation across the variable phase 65 of the servomotor 13; the fixed phase 66 of said motor being connected across the source of potential 20.

The armature of the servomotor 13 is coupled to the rudder 68 through a suitable coupling, herein shown by the dashed line 69. The coupling 69 is provided with a magnetic clutch 70 whereby the servomotor will be connected to said rudder upon energization of the clutch. A follow-up signal generator 72 is coupled as by 73, to the rudder 68 to provide a signal voltage responsive to the angular displacement of the rudder. The follow-up signal voltage developed is impressed through a lead 75 to the other side of potentiometer 42 in opposition to the direction signals applied by the lead 41.

With the relay 33 de-energized and the clutches 24 and 70 energized, the rudder channel of the system will operate in a manner well known in the art. The direction signal voltage and the rate of turn signal voltage are impressed on the rudder channel amplifier where the resultant signals are amplified and discriminated as to phase and applied to the saturating windings of the reactor 50. Dependent upon the phase of the result signal, the variable phase 65 of the servomotor 13 will be energized to drive the motor in a direction responsive to the phase of the resultant signal voltages. The operation of the servomotor 13 will thus position the rudder 68 in accordance with the signal voltages, the movement of the rudder 68 providing a signal voltage by means of the generator 72 tending to oppose the direction and rate signal voltages.

Means is now provided to control the aircraft by manipulation of the control stick 79 of the controller 16 through the rudder channel thus far described. To this end, the controller is provided with a rotary transformer 80 therein having a rotor 81 connected across the potential source 20 and a split stator winding 82 and 83. The movement of the control stick 79 athwartships will displace the rotor 81 with respect to the stator windings 82 and 83. The output of the stator coils 82, 83 is non-linear with respect to the displacement of the rotor winding 81. Non-linear rotary transformer 80 may be of a type disclosed and claimed in the U. S. application of Alan M. MacCallum bearing Serial No. 44,759, and filed on August 17, 1948, and issued as U. S. Patent No. 2,606,944 on August 12, 1952. Smaller increments of voltage are induced in the stator windings for equal increments of control stick displacement as the stick is moved from its neutral position. A refined control of the aircraft is obtainable by the non-linear response described about the neutral position of the control stick 79. The phase of the voltage is dependent upon the direction of stick displacement.

The stator winding 82 is connected across a potentiometer 85, the tap-off of said potentiometer being connected by a lead 86 through a resistor 87 to the lead 41. The resistor 87 is connected in parallel with the stator winding 21 of the direction signal transmitter 11. The voltages provided by the displacement of the controller are impressed on the rudder channel amplifier modifying the direction and rate signals to provide the controlling operation of the servomotor 13. The aircraft is thus controlled by the operation of the controller 16, the return of the stick 79 to its neutral position permitting the automatic pilot system to re-establish the control of the aircraft.

Means is now provided to develop a signal in proportion to the rudder forces to provide a bank trim signal which will maintain the aircraft in level flight.

To this end, there is provided an integrating device 90 herein shown as a heat exchange element comprising two resistors 91 and 92 connected in the amplifier plate circuits and adapted to be heated by the plate current flowing therethrough and two resistors 93 and 94 in heat exchange relation therewith inclosed in an envelope 95. The resistors 93 and 94 form a portion of a bridge circuit, the other arms of which comprise the two sections of a resistor 97 provided with a center tap 98. The junction of the resistors 93, 94 is grounded as at 99, while the junction of the resistors 91, 93 and 97, 94 are connected across the potential source 20. The center tap 98 of the bridge circuit described, is connected by a lead 100 to the input of an aileron channel amplifier 101.

The amplifier 101 is of the conventional type and will receive the signal voltages, amplify the same and discriminate as to the phase of the signal. The output of the amplifier is applied to a magnetic reactor or amplifier 102 similar to that shown for the rudder channel. The output of said reactor is applied via the leads 103 to the variable phase 104 of the servomotor 14, the fixed phase 105 of which is connected across the potential source 20. The servomotor is adapted to displace the ailerons 106 through a suitable coupling 107, the coupling 107 being provided with a magnetic clutch 108. The displacement of the ailerons 106 is adapted to drive a follow-up signal generator 110 through a coupling 111, the signal voltage thus developed being impressed through a lead 112 through a potentiometer 113 and lead 114 to the input of the amplifier 101 in opposition to the signal voltages of lead 100.

An aircraft flying in an untrimmed condition about its bank axis tends to fly off course, the direction of departure being dependent upon the low wing of the craft. To compensate for this course departure, the pilot while in manual flight will hold the rudder over to maintain an on-course flight. In the case of an automatic pilot flying the craft, the departure from the set course will provide a direction signal to move the rudder to hold the craft on the set course. It thus follows that an untrimmed bank condition of the shaft will require a torque to be delivered by the servomotor 13 to hold the rudder displaced so that the set course is satisfied. The torque thus supplied requires that a plate current flows through the saturating windings 48 or 49.

The heating elements 91 and 92 of the integrating device 90 are connected in parallel with the switches 51 and 57 respectively. With the switches 51 and 57 open as shown, the plate currents flowing through the lead 88 and saturating winding 48, or through the lead 89 and saturating winding 49 will flow through the resistors 91 and 92, respectively. Since the bridge circuit comprising the resistors 93, 94 and 98 is a normally balanced circuit, the heating of either of the resistors 91 or 92 will cause a change in the resistance of its allied resistor of the bridge circuit due to the heating thereof. A voltage dependent upon the rudder forces will thus be developed by the integrator 90 and applied to the input of the aileron channel amplifier 101 to operate the motor 14 in accordance therewith. The phase of this signal voltage will depend upon the direction of unbalance of the bridge circuit. The craft will thus be brought back to its trim position, the rudder signal subsiding as the craft once more heads on the set course in level flight.

To control the aircraft about the bank axis, a vertical gyro 130 is provided having a suitable coupling 131 interconnecting its bank axis with the rotor 132 of the bank signal transmitter 18, the transmitter together with its related trunnion of the gyro vertical 130 defining a bank attitude reference means.

The ends of the stator winding 133 are connected to a reversing switch 134 controlled by a relay coil 135. One terminal of the reversing switch is connected via lead 136 to one of the input terminals of the aileron channel amplifier 101; while the other switch terminal is connected by a lead 137 through a resistance 117 and a lead 138 to the other end of the potentiometer 113.

The bank signals developed by the bank transmitter 18 are applied to the input terminals of the aileron channel amplifier 101. The signal voltages developed are amplified and discriminated as to phase and applied by the output leads 103 of the magnetic amplifier 102 to the variable phase 104 of the servomotor 14 to position the ailerons 106 in accordance therewith.

Means is now provided in the controller 16, which may be of the type described in U. S. application of Francis H. S. Rossire bearing Serial No. 729,019 and filed on February 17, 1947, and issued as U. S. Patent No. 2,614,776 on October 21, 1952, to modify the bank trim signals to place the aircraft in a properly banked turn. To this end the resistor 117 is connected across the stator winding 83 of the rotary transformer 80. The resistor 117 is connected by the leads 137 and 138 across the input terminals of the amplifier 101.

Since the rotary transformer 80 of the controller 16 provides both a direction and bank signal, means is provided to disconnect the integrated bank trim signal of the rudder channel when a turn exceeding a predetermined bank angle is made.

To this end, there is provided a relay coil 120 for controlling the operation of the switches 51 and 57. One end of the relay coil 120 is grounded while the other end of said coil is connected through a lead 121 to a plus potential source 122 through two normally closed switches 123 and 124 and the pilot connect switch 201 which is normally closed when using the stick controller 16. The switch 124 is suitably coupled as by 125, to the control stick 79 of the controller. When the control stick is moved athwartships to place the craft in a banked turn in excess of five degrees, the switch 124 will open to break the energizing circuit described for the relay coil 120. The de-energization of the relay coil 120 will permit the switches 51 and 57 to close whereby the heating elements 91 and 92 of the integrator are short-circuited. With the heating elements 91 and 92 short-circuited, these elements will cool and re-establish the balanced condition of the bridge. The re-balancing of the bridge will wipe out the bank trim signal heretofore had when the switches 51 and 57 were open. The craft may thus be controlled by the displacement of the control stick through the automatic pilot system in making banked turns in excess of five degrees.

It will be noted that the magnetic clutch 24 is illustrated as having one side thereof grounded while the other side is connected to the lead 121 by a lead 126. The opening of the switch 124 by the displacement of the control stick will also de-energize the magnetic clutch to disconnect the master direction indicator from the direction signal transmitter 11.

The switch 123 in series with the switch 124 is adapted to be opened by depressing a button 127 in the control stick 79. The purpose of the switch 123 is to permit the disconnecting of the signal transmitter 11 from the master direction indicator so that the craft may be trimmed in heading. The opening of the switch 123 will also de-energize the relay 120 so that no bank trim signals are available during the trim operation.

The vertical gyro 130 further provides signal voltages to control the aircraft about the pitch axis by the pitch signal transmitter 17, such transmitter together with the related trunnion of vertical gyro 130 defining a pitch attitude reference means. The transmitter 17 is herein illustrated as a rotary transformer having a rotor winding 138 connected across the potential source 20 and coupled as by 140, to the pitch axis of the gyroscope. The stator winding 141 is grounded at one end and connected at the other end by a lead 142 to a resistor 152, the other end of which is connected by lead 153 to a potentiometer 154. A tap-off on the potentiometer is connected by a lead 155 to the input terminal of an elevator channel amplifier 150 of conventional design.

The output of the elevator channel amplifier 150 is connected by the leads 158 and 159 through the saturating windings 160 and 161 of a magnetic reactor or amplifier 162 similar to the reactor 50 in the rudder channel. The saturating windings 160 and 161 are connected through resistors 164 and 165 forming the heating elements of an integrating device 166 to the terminals of a grounded center-tapped secondary winding 167 of a transformer 168. The primary winding 169 of said transformer is connected across the power supply 20.

The primary windings 170 and 171 of the reactor 162 are series connected and connected by leads 172 across the power supply 20. The secondary windings 174 and 175 are connected series opposed across the variable phase 176 of the servomotor 15; the fixed phase 177 of which is connected across the power supply 20.

The servomotor 15 is suitably coupled as by 178 through a magnetic clutch 180 to the elevators 181. The elevator 181 is suitably connected as by 182, to a signal transmitter 183. The signal voltage developed by the transmitter 183 is impressed by a lead 184 to one end of the potentiometer 154.

The pitch signal developed by the transmitter 17 is amplified by the amplifier 150 and discriminated as to phase to operate the saturable reactor 162. The servomotor 15 will be operated in a direction responsive to the phase of the signal voltage to position the elevators 181 in accordance therewith; the follow-up signal of the transmitter 183 opposing the pitch signal to provide a null condition when the aircraft is again in level flight.

The integrator 166 is included in the elevator channel of the automatic pilot system to provide a persistant elevator signal for maintaining the craft in its flight attitude upon engagement of the pilot so that the attitude of the aircraft is temporarily maintained to permit a gentle level off of the plane.

The integrator 166 includes, besides the heating elements 164 and 165, the two resistors 190 and 191 enclosed in an envelope 193. A resistor 194 connected in parallel with the resistors 190 and 191 and across the voltage source 20 completes the bridge circuit similar to that heretofore described. The junction of resistors 190 and 191 is grounded as at 195; the resistor 194 being provided with a center-tap 196. The center-tap 196 is connected by a lead 197 to the input lead 155 of the amplifier 150.

The heating elements 164 and 165 of the integrating device 166 are connected in parallel with the normally open switches 198 and 199 controlled by the energization of a relay coil 200. Upon energization of a relay coil 200, the switches 198 and 199 will be closed, short-circuiting the heating elements 164 and 165 so that the amplifier output no longer flows through these elements. The relay coil is normally de-energized but is adapted to be energized upon engagement of the pilot by the closure of a switch 201. The energizing circuit for the relay 200 may be traced from the power source 122 through the closed switch 201 and leads 202, a time delay device 203 and lead 204 through the coil to the ground connection.

The pilot system described is engaged by closing the switch 201. The time delay device 203 will connect the amplifiers into the power circuit via lead 202 permitting the cathodes thereof to be heated. After a predetermined time interval, the energizing circuits for the relay 200 and the clutches 70, 108 and 180 will be closed to permit operation of the pilot system. Since the pilot system can be connected at any attitude of the craft, a condition of bank or pitch attitude may exist at that time. A pitch signal in the elevator channel will cause either of the resistors 164 or 165 to heat up thereby causing a change in one of the resistors 190 or 191. The change in either of these resistors will unbalance the bridge circuit to provide a displacement signal which is fed into the elevator amplifier 150. Should the pilot be engaged when the craft is either in a climb or drive attitude, the switches 198 and 199 will be closed by the energization of the relay 200. The short-circuiting of the heater elements 164 and 165 of the integrator 166 will allow these elements to cool. However, since the cooling of these elements will require some time, a signal voltage will be provided in the elevator channel which will temporarily maintain the craft in its pitch attitude. As the elements 164 or 165 cool, the pitch signal developed will diminish until a point is reached at which the craft will level off in accordance with the pitch signals of the transmitter 17.

Means is also provided for controlling the aircraft through the pilot system by the movement of the control stick 79 in a fore and aft direction.

To this end, the controller 16 is provided with a rotary transformer 205, the rotor winding 206 of which is connected to the power supply 20, while the stator winding 207 is connected across the resistor 152. By a suitable coupling to the control stick 79 the rotor 206 may be displaced with reference to the stator winding 207 to induce therein a signal voltage. The rotary transformer 205 is of the non-linear type already described so that decreasing increments of signal voltage are provided as the displacement of the stick is increased; the phase of the signal voltage being responsive to the direction of displacement.

The signal voltages induced in the stator winding 207 are impressed in parallel across the input leads 142 and 155 of the amplifier 150 with the signal voltage of the pitch transmitter 17. The signals developed by the controller are such as to take over the control of the pilot system to operate the elevators 181.

With the pilot system thus far described, it will be apparent that upon engagement of the controller 16, the aircraft may be put through any type of acrobatic maneuvers by the manipulation of the control stick 79. However, in making an Immelmann turn or in inverted flight, the direction and attitude signals are reversed due to the tumbling of the gyro verticals.

To this end, therefore, the pitch axis of the gyro vertical 26 of the compass system is provided with the switch 35 which will energize the reversing relay 33 as the plane enters a 90° climb when conducting insert 46 will contact brush 56 thereby establishing an electrical circuit between the source of D. C. potential and lead 71 connected to the energizing winding of relay 33. The action of the reversing relay 33 will thus reverse the signal voltages of the coupling transmitter 31 to provide a correct direction signal.

The gyro vertical 130 is also provided about its pitch axis with a normally open switch 210 which is adapted to be closed when the craft enters a 90° climb or dive by means of an arrangement which may be similar to that used in connection with the gyro vertical 26 and illustrated in Fig. 2. The closure of the switch 210 will energize the reversing relay 135 to actuate the reversing switch 134 thereby reversing the polarity of the bank transmitter signals. By the reversal of the direction signals and the bank signals in the manner described, the signal ambiguities heretofore had are eliminated to permit inverted flight of an aircraft through an automatic pilot system.

It will now be readily apparent that the hereinbefore described pilot system may be engaged at any time irrespective of the flight attitude of the craft. After switch 201 has been closed and the system becomes effective after a short time interval, the bank and pitch attitude of the craft will be corrected by the integrating devices 90 and 166, respectively.

Closure of the switch 201 will energize the relay 129 to connect the heater elements 91 and 92 into the amplifier plate circuits. The signal developed by the integrator 90 will level off the craft about the bank axis. The pitch axis operates in a reverse manner, the relay 200 short circuiting the heater elements 164 and 165 of the integrator 166. The cooling of the elements 164 or 165 will provide a pitch signal which tends to maintain the craft in its former attitude, the craft gradually levelling off upon the cooling of the heater elements.

The magnetic clutches provided between the servomotors and the signal transmitters coupled to the flight control surfaces permit the pilot system to be engaged at any time irrespective of the flight attitude of the craft. The transmitters are always in a position to develop a signal voltage dependent upon the position of the surface upon connecting the pilot system. Heretofore, with the transmitters coupled to the servomotors, the surfaces had to be moved to their neutral, or null transmitter position before the pilot system could be connected.

It will thus be seen that there is provided an automatic pilot system for mobile craft in which the several objects of this invention are achieved, and which is well adapted to meet the conditions of practical use.

As many embodiments may be made of the above invention, and as various changes may be made in the embodiment above set forth, it will be understood that all matter herein set forth, or shown in the accompanying drawing is to be interpreted as illustrative and not in a limiting sense.

Having thus described our invention, we claim as new and desire to secure by Letters Patent:

1. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means responsive to rudder forces developed by the rudder servomotor as a result of a bank attitude of the craft causing a change in craft course for developing a signal to trim the craft in bank to maintain the desired craft course, means responsive to a predetermined pitch attitude of the craft for developing a signal for maintaining the craft temporarily in the predetermined pitch attitude, to thereby avoid a sudden levelling-off of the craft and manually movable means for operating said rudder, aileron and elevator surfaces and operably associated with said rudder force responsive means, said manual means when moved making said rudder force responsive means ineffective.

2. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, and means for reversing said course signal when said craft enters a 90° climb.

3. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, and means for reversing the bank signals when the craft enters a 90° climb or dive.

4. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means for reversing the course signal when said craft enters a 90° climb, means for reversing said bank signal when the craft enters a 90° climb or dive, means responsive to rudder forces developed by a bank attitude of the craft in maintaining the craft on the predetermined course for developing a signal to trim the craft in bank, and means responsive to a predetermined pitch attitude of the craft for developing a signal to maintain the craft temporarily in the predetermined pitch attitude to thereby avoid a sudden levelling-off of the craft.

5. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means for reversing the course signal when said craft enters a 90° climb, means for reversing the bank signal when said craft enters a 90° climb or dive, means responsive to rudder forces developed by the bank attitude of the craft in maintaining the craft on the predetermined course for developing a signal to modify said bank signal, means responsive to a predetermined pitch attitude of the craft for developing a signal to maintain the craft temporarily in the predetermined pitch flight attitude to thereby avoid a sudden leveling-off of the craft, and a stick controller having rudder, bank and pitch signal transmitters responsive to the movement thereof about the pitch and bank axes to modify said course, bank, and pitch signals to control the flight of the craft.

6. In an automatic pilot for aircraft having rudder and aileron surfaces for controlling the heading and bank attitude of said craft, the combination comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, a follow back signal transmitter for each of said surfaces to develop a signal responsive to the position of the respective surfaces for modifying the respective control signals developed, and an integrator responsive to the course and course follow back signals to maintain the craft in bank trim condition.

7. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, an integrator responsive to the course and course follow up signals for developing a signal to trim the craft in bank, and a second integrator responsive to the pitch attitude of the craft for developing a signal to maintain the craft temporarily in that pitch attitude to thereby overcome sudden levelling-off of the craft to a second and pre-selected pitch attitude.

8. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, a stick controller having rudder, bank and pitch signal transmitters therein responsive to the movement thereof about the pitch and bank axes to modify said course, bank, and pitch signals to control the flight of the craft, an integrator responsive to the course, course follow-up and controller rudder signals for developing a signal to modify said bank signal, and a second integrator responsive to the pitch attitude of the craft for developing a signal to maintain the craft temporarily in that pitch attitude to thereby overcome sudden craft attitude change to a second and pre-selected pitch attitude.

9. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means for reversing the course signal when the craft enters a 90° climb, means for reversing the bank signals when said craft enters a 90° climb or dive, a stick controller having rudder, bank and pitch signal transmitters therein responsive to the movement thereof about the pitch and bank axes to modify said course, bank, and pitch signals to control the flight of the craft, an integrator responsive to course, course followback and controller direction signals for developing a signal to modify said bank signal, and a second integrator responsive to the pitch attitude of the craft for developing a signal to maintain the craft temporarily in that pitch flight attitude to thereby overcome sudden craft attitude change to a second and pre-selected pitch attitude.

10. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means for reversing the course signal when the craft enters a 90° climb, means for reversing the bank signals when said craft enters a 90° climb or dive, a stick controller having rudder, bank and pitch signal transmitters therein responsive to the movement thereof about the pitch and bank axes to modify said course, bank, and pitch signals to control the flight of the craft, an integrator responsive to course, course follow back and controller direction signals for developing a signal to modify said bank signal, a second integrator responsive to the pitch attitude of the craft for developing a signal to maintain the craft temporarily in that pitch attitude to thereby overcome sudden craft attitude change to a second and pre-selected pitch attitude, and switch means operated by said stick controller to disconnect said course signal source and said course integrated signal when said craft is put into a banked turn by said controller.

11. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means for reversing the course signal when the craft enters a 90° climb, means for reversing the bank signals when said craft enters a 90° climb or dive, a stick controller having rudder, bank and pitch signal transmitters therein responsive to the movement thereof about the pitch and bank axes to modify said course, bank, and pitch signals to control the flight of the craft, an integrator responsive to course, course follow back and controller direction signals for developing a signal to modify said bank signal, a second integrator responsive to the pitch attitude of the craft for developing a signal to maintain the craft temporarily in that pitch attitude to thereby overcome sudden changes in pitch attitude, and switch means operated by said stick controller to disconnect said course signal source and said course integrated signal when said craft is put into a banked turn by said controller, said second integrator being effective a predetermined time interval after the pilot system is connected to operate said craft.

12. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, means responsive to rudder forces developed by the bank attitude of the craft in maintaining the craft on the predetermined course for developing a signal to modify said bank signal, means responsive to the pitch attitude of the craft for developing a signal to maintain the craft temporarily in that pitch attitude to thereby overcome sudden changes in pitch attitude, and a stick controller having rudder, bank and pitch signal transmitters therein responsive to the movement thereof about the pitch and bank axes to modify said course, bank, and pitch signals to control the flight of the craft, said controller signals being non-linear with respect to the movement of said controller.

13. An automatic pilot for aircraft having rudder, aileron, and elevator surfaces for controlling the heading and flight attitude of said craft, comprising a servomotor for moving each of said surfaces, course reference means on said craft for developing a signal in response to a departure of said craft from a predetermined course to energize the rudder servomotor, bank attitude reference means for developing a signal in response to a departure from level flight of the craft about the bank axis to energize said aileron servomotor, pitch attitude reference means for developing a signal in response to a departure of the craft from level flight about the pitch axis to energize the elevator servomotor, a follow back signal transmitter for each of said surfaces to develop a signal responsive to the position of the respective surfaces for modifying the respective control signals developed, clutches interconnecting said servomotors and said flight surfaces, the opening of said clutches disconnecting said servomotors from said surfaces operating said transmitters, means responsive to rudder forces developed by the bank attitude of the craft in maintaining the craft on the predetermined course for developing a signal to modify said bank signal, means responsive to a predetermined pitch attitude of the craft for developing a signal to maintain the craft temporarily in the predetermined pitch attitude to thereby overcome sudden changes in pitch attitude, and a stick controller having rudder, bank and pitch signal transmitters therein responsive to the movement thereof about the pitch and bank axes to modify said course, bank, and pitch signals to control the flight of the craft, said controller signals being non-linear with respect to the movement of said controller.

14. In an automatic pilot for aircraft having a flight surface for controlling the attitude of said craft, the combination comprising a servomotor adapted for moving said surface, attitude reference maintaining means for developing a signal in response to a departure of the craft from a predetermined attitude to energize said motor, and means comprising a heat exchange device connected to said attitude reference maintaining means and responsive to the signal for providing a persistent attitude signal to maintain the craft temporarily in said predetermined attitude to overcome sudden craft attitude change.

15. In an automatic pilot for aircraft having a flight surface for controlling the pitch attitude of the craft, attitude reference means for developing a signal in response to inclined craft attitude, said attitude reference means being disconnected from said surface but adapted for connection therewith to control said surface to reestablish level craft flight, means comprising a thermal time delay device connected to said attitude reference means and responsive to said signal for providing a persistent signal to maintain the craft temporarily in the inclined attitude when the reference means has been connected with said surface, and means for connecting said reference means with said surface.

16. In an automatic pilot for aircraft having a flight surface for controlling the pitch attitude of the craft, attitude reference means for developing a signal in response to inclined craft attitude, said attitude reference means being disconnected from said surface but adapted for connection therewith to control said surface to return the craft to a predetermined pitch attitude, means comprising thermal time delay means connected to said attitude reference means and responsive to said signal for making said signal temporarily ineffective when the reference means has been connected with said surface to thereby overcome suddent craft pitch attitude change, and means for connecting said reference means with said surface.

17. An aircraft automatic pilot having servomotors for operating craft rudder and aileron surfaces, comprising course change responsive means adapted for controlling the rudder motor, said course change means operating said rudder motor to exert a torque on the rudder surface during a craft bank condition, means operative in response to the operation of the rudder motor for operating the aileron servomotor to automatically trim the craft in bank, means comprising a manually operable member for operating the rudder and aileron motors for turning and banking the craft, and means operable by said manually operable member for making the course change responsive means ineffective on the rudder motor and the automatic trim means ineffective on the aileron motor.

18. An aircraft automatic pilot for controlling craft rudder, aileron and elevator surfaces, comprising course and attitude reference means for developing control signals for positioning said surfaces, a manually operable member for developing control signals to displace the craft control surfaces whereby the craft is placed in a preselected attitude, and means operably associated with at least one of said course or attitude reference means and responsive to a predetermined craft attitude for reversing the control signal thereof.

ALAN M. MacCALLUM.
CORLES M. PERKINS, Sr.

References Cited in the file of this patent

UNITED STATES PATENTS

| Number | Name | Date |
| --- | --- | --- |
| 2,415,430 | Frische et al. | Feb. 11, 1947 |
| 2,464,629 | Young | Mar. 15, 1949 |
| 2,471,821 | Kutzler | May 31, 1949 |
| 2,570,905 | Young et al. | Oct. 9, 1951 |